US012643836B2

(12) United States Patent
Gonzagowski

(10) Patent No.: US 12,643,836 B2
(45) Date of Patent: **\*Jun. 2, 2026**

(54) AGRICULTURAL FERTILIZERS WITH MONTMORILLONITE CLAYS

(71) Applicant: Richard Gonzagowski, Albuquerque, NM (US)

(72) Inventor: Richard Gonzagowski, Albuquerque, NM (US)

( * ) Notice: Subject to any disclaimer, the term of this patent is extended or adjusted under 35 U.S.C. 154(b) by 564 days.

This patent is subject to a terminal disclaimer.

(21) Appl. No.: 18/120,790

(22) Filed: Mar. 13, 2023

(65) Prior Publication Data

US 2023/0212088 A1 Jul. 6, 2023

Related U.S. Application Data

(63) Continuation-in-part of application No. 17/217,380, filed on Mar. 30, 2021, now Pat. No. 11,603,336.

(60) Provisional application No. 63/002,472, filed on Mar. 31, 2020.

(51) Int. Cl.
*C05F 11/02* (2006.01)
*C05D 1/00* (2006.01)

(52) U.S. Cl.
CPC .............. *C05F 11/02* (2013.01); *C05D 1/00* (2013.01)

(58) Field of Classification Search
CPC .................................. C05F 11/02; C05D 1/00
See application file for complete search history.

(56) References Cited

U.S. PATENT DOCUMENTS

| | | | |
|---|---|---|---|
| 11,603,336 B1 * | 3/2023 | Gonzagowski | .......... C05G 5/10 |
| 2010/0154498 A1 * | 6/2010 | Valencia | ................. C05D 9/02 |
| | | | 71/23 |
| 2019/0014788 A1 * | 1/2019 | Sawant | ................... A01N 63/20 |
| 2021/0253488 A1 * | 8/2021 | Sawant | .................... C05D 3/00 |

* cited by examiner

*Primary Examiner* — Wayne A Langel
(74) *Attorney, Agent, or Firm* — Rod D. Baker

(57) ABSTRACT

An agricultural or horticultural fertilizer, and method of making the fertilizer, featuring processed montmorillonite clay and other ingredients for improving plant growth and health. Liquid fertilizers for use in drip irrigation may comprise potash in an aqueous blend, as well as citric acid and humate. The method involves the preparation of a montmorillonite mineral-humate solution, which solution is mixed with other ingredients. In an early step, the montmorillonite and the humate are mixed with water and citric acid, and then blended or mixed over a period of time sufficient for the citric acid to leach the montmorillonite and humate into solution. The solution is then filtered to remove solid mineral residue. The filtered solution is then mixed with *Aloe vera* and potash to prepare a concentrated liquid.

14 Claims, No Drawings

AGRICULTURAL FERTILIZERS WITH MONTMORILLONITE CLAYS

CROSS REFERENCE TO RELATED APPLICATIONS

This application is a continuation-in-part of U.S. patent application Ser. No. 17/217,380 (now U.S. Pat. No. 11,603, 336) filed on 30 Mar. 2021, which application claimed the benefit of U.S. Provisional Patent Application Ser. No. 63/002,472 entitled "Agricultural Fertilizers with Montmorillonite Clays," filed on 31 Mar. 2020. The entire disclosures of both said applications are incorporated herein by reference.

BACKGROUND OF THE INVENTION

Field of the Invention

This invention relates to agricultural fertilizers, particularly to organic fertilizers, and specifically to a fertilizer including montmorillonite mineral.

Background Art

The use of soil amendments and fertilizers is long and widely known in agriculture. Naturally generated or "organic" fertilizers for centuries have included animal manures and ordinarily created biomass and natural wastes or byproducts, such as kitchen offal. Simply described, natural fertilizers are organic products that have been extracted from living things or from the earth, and can be either plant-derived or animal-derived. Typical modern examples in agricultural and gardening use are mushroom manure, blood meal, bone meal, cottonseed meal, kelp meal, poultry or horse manure (aged), and compost.

Also known in the modern era are synthetic fertilizers, those generated using chemical manufacturing processes. Synthetic fertilizers are usually composed of the synthesized chemicals of nitrogen (N), phosphorus (P) and potassium (K). In general, natural fertilizers contain lesser amounts of N—P—K than their synthesized counterparts, so the farmer/gardener usually must use more of them to supply the plant with the required amount of nitrogen, phosphorus, or potassium. However, because natural fertilizers add vital organic matter, they may also improve soil texture.

Inorganic "mineral fertilizers" are used to improve agricultural yields. In mineral fertilizers, the nutrients are inorganic salts, obtained by extraction and/or physical and chemical processes. As with organic fertilizers, the three primary plant nutrients again are nitrogen, phosphorus, and potassium. Mineral fertilizers are chemically processed to meet crop requirements and can supply plant nutrients in exact, scientifically formulated quantities. Mineral fertilizers are generally cost effective, but ideally should be used together with organic fertilizers which improve soil structure and the soils water holding capacity.

Against the foregoing background, the present fertilizer compositions were developed to provide some of the advantages of both organic and inorganic types of fertilizers.

SUMMARY OF THE INVENTION

There are disclosed herein an agricultural or horticultural fertilizer featuring processed montmorillonite clay and other ingredients for improving plant growth and health. There is provided a montmorillonite-humate fertilizer blend liquid for use in drip irrigation prepared in a step process or method. The method involves the preparation of a montmorillonite mineral-humate solution, which solution is mixed with other ingredients. In an early step, the montmorillonite and the humate are mixed with water and citric acid, and then blended or mixed over a period of time sufficient for the citric acid to leach the montmorillonite and humate into solution (leaving a mineral residue composed mostly of silicates). The solution is then filtered to remove solid mineral residue. The filtered solution is then mixed with *Aloe vera* and potash.

In one embodiment of the method and resulting product, approximately one U.S. gallon of montmorillonite-humate fertilizer blend liquid for use in drip irrigation may be prepared by mixing between about 3.690 kilograms and about 3.803 kilograms water, between about 0.794 kilograms and about 1.021 kilograms milled montmorillonite, between about 0.794 kilograms and about 1.021 kilograms milled humate, and between about 0.006 kilograms and about 0.017 kilograms citric acid. The mixing is continued for at least a minute. The minerals are leached out by the citric acid, after which silica residue is removed, for example by filtration to catch and collect larger particulates (e.g., greater than 0.0029 inches (74 micron) mean diameter). The resulting solution is then mixed with between about 0.028 kilograms and about 0.085 kilograms *Aloe* liquid. Potash is then added, with additional mixing, as needed to achieve a solution pH of between 6.8 and 7.0. For example, between about 0.006 kilograms and about 0.017 kilograms potash usually induces the desired pH range (depending upon the acidity of water used). The foregoing method produces about a gallon of concentrated solution suited for use. The disclosed ratios can be scaled up according to principles known in the art for producing larger (or smaller) batches as desired. Other, particularized formulations, and alternative embodiments, are disclosed hereafter; this summary is not intended to be limiting.

DESCRIPTION OF THE INVENTION, INCLUDING THE BEST MODE FOR PRACTICING THE INVENTION

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims. compositions of the present disclosure will now be described more fully hereinafter. The fertilizer of the present disclosure may be in many different forms and should not be construed as limited to the tabulated embodiments set forth herein; rather, these embodiments are provided so that this disclosure will be thorough and complete, and will fully convey its scope to those skilled in the art.

There are disclosed formulations of beneficial agricultural fertilizer compositions including Montmorillonite clay and other natural ingredients to promote healthy plant growth and to reduce the need for synthetic pesticides. It has been determined that particular combinations of Montmorillonite with *Aloe* powder and *Acacia* gum result in a fertilizer composition beneficial to plant growth for either horticultural or agricultural applications. The mineral fertilizer stimulates beneficial microorganisms in the soil, as well as improving the structure of the soil. Soil microbes play an important role in converting organic fertilizers into soluble nutrients that can be absorbed by plants. The organic mineral fertilizers provide micronutrients plants use, and without replacing these nutrients the plants deplete the soil and weaken.

"Montmorillonite" is a group of clay minerals varieties that swell in water and exhibit high cation-exchange capacities. A basic formula for Montmorillonite (that is, without structural substitutions) is $(OH)_4Si_8Al_4O_{20} \cdot nH_2O$. Montmorillonite minerals are products of volcanism and hydrothermal activity. Montmorillonites are composed of hydrous aluminum silicates in the form of extremely small particles which take up water between their layers. This water absorption causes swelling, and changes the interlayer spacing (according to the mineral variety). In addition to being involved in inorganic exchange reactions, they react with and absorb some organic liquids, such as amines, glycols, glycerols, and other polyhydric alcohols. While the incorporation of Montmorillonites into agricultural fertilizers is previously known, these minerals are more commonly used as bleaching earths for clarifying water, juices, and liquors, as well as for removing color from mineral and vegetable oils. Montmorillonites also are used in petroleum refining processes. In the present invention, this natural accruing mineral is mixed with other ingredients to produce a fertilizer that not only increases a plant's yield, but also promotes a natural ability of the plant to resist disease and pests. Montmorillonite powders employed herein may be milled if necessary to obtain requisite fineness.

Gum arabic, also often called *Acacia* gum or *Acacia* powder, and sometimes other names, is a fibrous product made from the natural hardened sap of two types of wild *Acacia* trees which grow in Africa. Hereinafter, for the sake of simplicity this substance will usually be referred to hereinafter as "*Acacia*" or "*Acacia* gum." The most commonly used type of tree is *Acacia senegal* (L.), a tree in the Leguminosae (Fabaceae) plant family. *Vachellia* (*Acacia*) is another species that produces a dried gum from its trunk and branches, and used to formulate *Acacia* gums. *Acacia* gum is made of a mixture of glycoproteins, which have carbohydrate groups attached to the polypeptide chain, and of polysaccharides, a carbohydrate whose molecules consist of a number of sugar molecules bonded together. It also includes oligosaccharides, another type of carbohydrate. Additionally, gums collected from *Acacia* trees are a source of natural sugar compounds called arabinose and ribose. The exact chemical composition of gum arabic varies, depending on its source and the climate/soil conditions in which it was grown. The source and exact type of *Acacia* gum is not presently believed to be significant to the utility of the present invention, but *Acacia* gum is a beneficial ingredient of this fertilizer.

*Aloe vera* (hereinafter often shortened to "*Aloe*") is a stemless or very short-stemmed plant with thick and fleshy, green to grey-green leaves, with some varieties showing white flecks on their upper and lower stem surfaces. *Aloe vera* forms arbuscular mycorrhiza, a symbiosis that allows the plant better access to mineral nutrients in soil. *Aloe vera* leaves contain phytochemicals which may manifest possible beneficial bioactivity, such as acetylated mannans, polymannans, anthraquinone C-glycosides, anthrones, and other anthraquinones, such as emodin and various lectins. The incorporation of *Aloe* into the composition of the invention extends the benefit that plants treated with the composition have better uptake and absorption into their roots of desirable nutrients.

The presently disclosed fertilizers are composed of combinations of ingredients including (but strictly limited to) Montmorillonite, *Acacia* gum, and *Aloe*. It has been determined that inventive formulations that include these compositions result in effective fertilizers for improving agricultural yields. The fertilizer may be an admixture to a potting soil, or applied on and in the soil adjacent growing plants, and certain embodiments may be used as root dips.

A preferred embodiment of a fertilizer composition according to the present disclosure is comprised of the following ingredients: a fine Montmorillonite powder (a soft phyllosilicate mineral); *Aloe* powder (from plant genus *Aloe*, preferably species *vera*); and *Acacia* gum (i.e., gum Arabic). As described in additional detail herein, the fertilizer may be provided in dry powder form, or alternatively may be formulated in an aqueous liquid. A basic dry powder formulation may comprise about 85 weight percent Montmorillonite, about 6 weight percent *Aloe*, and about 9 weight percent *Acacia* gum. Composed as a liquid, the invention may be about 80 weight percent water, about 10 weight percent Montmorillonite, about 6 weight percent *Aloe*, and about 4 weight percent *Acacia* gum.

For use in the present fertilizers, the Montmorillonite is acquired from a suitable source, such as from World Mine 73 in Mineral County, Nevada, and available from the through RAAK Minerals, LLC, P.O. Box 2274 Hawthorne NV 89415. The Montmorillonite preferably is milled in a hammer mill so to pass a −200 (minus two hundred) mesh screen, i.e., all particles smaller than 200-mesh pass through. (Mesh 0.074 millimeter.) Mineral batches (e.g., 1,000 pound batches) preferably are leached with pure citric acid. Acidity levels should be controlled; accordingly, potash preferably is then admixed to the milled mineral to obtain a pH of between about 6.8 pH and about 7.0 pH. The Montmorillonite thus processed is then mixed mechanically by any suitable means with the other ingredients to create the fertilizer composition. It has been determined that the Montmorillonite promotes beneficial growth of the plants, as well as reducing incidence of pests and disease.

Also, *Aloe vera* as an ingredient of the present fertilizer, preferably is included as an extracted organic part (i.e., *Aloe vera* gel), and/or as concentrated raw material (i.e., concentrated/unfiltered *Aloe vera* juice). The organic part is preferred as it is believed responsible for providing beneficial polysaccharides and phytochemicals to the plants, but concentrated raw material can be used to along with the gel to ameliorate pest attack.

*Acacia* gum in the proportions disclosed functions as, among other things, a granulating and/or binding agent, and promotes emulsification in aqueous solutions of the invention.

The formulations of the present invention, as set forth herein, have been determined after experimentation to provide unexpected enhancement of horticultural yields and growth for, example, medicinal *Cannabis sativa*.

A basic dry fertilizer composition according to the present disclosure comprises three dry ingredients, namely montmorillonite, *Aloe*, and *Acacia*. When presented as a dry power blend, the components preferably are mixed to be comprised of, on a weight percent basis, between 83% and 87% milled montmorillonite, between 4% and 6% *Aloe* powder (100×), and the remainder between 9% and 11% *Acacia* gum. *Aloe vera* powder 100× starts as *Aloe* gel that is mechanically separated (e.g., to remove pulp and fiber) from the leaves of the *Aloe* plant, processed from the inner fillet of the *Aloe* leaf. Care is taken to minimize disruption of the Aloin layer. The gel has a thick consistency, but after a few minutes, an enzymatic reaction occurs, and the product becomes a liquid. (The *Aloe* powder 100× product may then freeze dried to preserve its phytonutrients and active compounds.)

It has been determined that one preferred mineral fertilizer dry blend (1 kg) may be mixed according to the following Table 1:

TABLE 1

| | | | Mineral Fertilizer Blend Dry | |
| ITEM # | POTENCY PER UNIT | ADJ. GRAMS | INGREDIENT | Weight KG |
| --- | --- | --- | --- | --- |
| 1 | 85.0% | 850.0 | Milled Montmorillonite | 0.850 |
| 2 | 6.0% | 6.0 | Aloe Powder 100× | 0.060 |
| 3 | 9.0% | 9.0 | Acacia Gum | 0.090 |
| | 100% | 1000.0 | Total Gross Wt. | 1.000 |

By way of illustrative example, one pound (1.0 lbs.) of fertilizer blend dry is prepared by dry mixing 13.60 ounces (85% by weight) milled montmorillonite, 0.96 ounces (6% by weight) *Aloe* powder, and 1.44 ounces (9% by weight) *Acacia* gum. Batches may be prepared by scaling the ingredient amounts according to these ratios.

A person skilled in the art notes that the dry blend may be mixed in appropriate concentration with water to provide a composition suitable for dispersal or application as an aqueous liquid or spray.

The fertilizer composition may be specially prepared initially, and then applied, as an aqueous solution. The liquid solution it can be added directly to the normal watering schedule, in both agricultural and horticultural contexts.

A liquid blend embodiment of the fertilizer composition preferably is mixed to be comprised of, on a weight percent basis, between 9% and 11% montmorillonite, between 4% and 7% *Aloe* liquid (1×), between 4% and 6% *Acacia* gum, and the remainder between 76% and 83% water. *Aloe* liquid (1×) is single-strength *Aloe vera*, and may be reconstituted from concentrated (200×) spray-dried powder.

A preferred embodiment of a mineral fertilizer blend liquid (by weight) was determined to be that set forth in Table 2:

TABLE 2

| | | | Mineral Fertilizer Blend Liquid | |
| ITEM # | POTENCY PER UNIT | ADJ. GRAMS | INGREDIENT | Weight KG |
| --- | --- | --- | --- | --- |
| 1 | 80.00% | 800.0 | Water | 0.800 |
| 2 | 10.00% | 10.0 | Milled Montmorillonite | 0.100 |
| 3 | 6.00% | 60.0 | Aloe Liquid 1x | 0.060 |
| 4 | 4.00% | 40.0 | Acacia Gum | 0.040 |
| | 100% | 1000.0 | Total Gross Wt. | 1.000 |

By way of illustrative example, approximately one U.S. gallon of mineral fertilizer blend liquid may be prepared by mixing 3.78 kilograms water, 0.48 kilograms milled montmorillonite, 0.28 kilograms *Aloe* liquid, and 0.19 kilograms *Acacia* gum, for about one gallon of solution weighing approximately 4.73 kilograms. Larger batches (e.g., 100 gallons) may be prepared by scaling the ingredient amounts according to these ratios.

As mentioned previously, a fertilizer composition according to the present disclosure also may be formulated for use as a root dip. In the root dip embodiment, the composition improves the ability of young plants to withstand transplant shock, protects bare roots during planting, and starts feeding the plant right away. The formulation for a root dip includes *Agar* as an ingredient, to provide some viscosity or body to the composition to promote clinging or adhesion to the roots.

Formulated as a liquid root dip, a fertilizer composition according to the present disclosure preferably comprises, by weight percent, between 9% and 10% montmorillonite, between 4% and 6% *Aloe* liquid, between 3% and 5% *Acacia*, between 4% and 5% *Agar*, and the balance between 74% and 80% water.

A most preferred embodiment of a liquid root dip blend of the present invention is provided in Table 3:

TABLE 3

| | | | Mineral Fertilizer Blend Concentrate Liquid Root Dip | |
| ITEM # | POTENCY PER UNIT | ADJ. GRAMS | INGREDIENT | Weight KG |
| --- | --- | --- | --- | --- |
| 1 | 76.2% | 762.0 | Water | 0.762 |
| 2 | 9.5% | 95.2 | Milled Montmorillonite | 0.095 |
| 3 | 6.0% | 60.0 | Aloe | 0.060 |
| 4 | 3.5% | 35.2 | Acacia Gum | 0.035 |
| 5 | 4.8% | 47.6 | Agar | 0.048 |
| | 100.0% | 1000.0 | Total Gross Wt. | 1.000 |

By way of illustrative example, approximately one U.S. gallon of mineral fertilizer blend liquid root dip may be prepared by mixing 3.78 kilograms water, 0.48 kilograms milled montmorillonite, 0.28 kilograms *Aloe* liquid, 0.17 kilograms *Acacia* gum, and 0.24 kilograms *Agar*, for a gallon solution weighing approximately 4.95 kilograms. Larger batches (e.g., 100 gallons) may be prepared by scaling the ingredient amounts according to these ratios.

An alternative composition according to the present inventions may be formulated as a colloidal liquid, non-plugging, organic mineral fertilizer, for increasing yields and reducing pesticide use, for particularized application by drip system irrigation. Gum Arabic is omitted from the non-clogging formulation s for use in drip irrigation, and potash powder (potassium carbonate, potassium chloride, or potassium sulfate) is added. Application of the fertilizer is simplified by using an existing drip system. Advantageously, montmorillonite minerals in a colloidal state have a higher bioavailability to the plant and soil microorganisms. The composition preferably is mixed as a concentrate, for later dilution by a factor of about 100, prior to use. A concentrated mineral fertilizer blend composition for use in drip irrigation according to this disclosure preferably comprises between 11% and 13% milled montmorillonite, between 5% and 10% citric acid, between 4% and 7% *Aloe vera* liquid, between 0.5% and 1.0% potash, and the remainder between 69% and 79.5% water. A most preferred embodiment of such a mineral fertilizer for a drip irrigation system is set forth in Table 4 below.

TABLE 4

Mineral Fertilizer Blend Concentrate Liquid for Use in Drip Irrigation

| ITEM # | POTENCY PER UNIT | ADJ. GRAMS | INGREDIENT | Weight KG |
|---|---|---|---|---|
| 1 | 76.00% | 760.0 | Water | 0.76 |
| 2 | 12.00% | 120.0 | Milled Montmorillonite | 0.12 |
| 3 | 5.00% | 50.0 | Citric Acid | 0.05 |
| 4 | 6.00% | 60.0 | Aloe Vera Liquid | 0.06 |
| 5 | 1.00% | 10.0 | Pot Ash | 0.01 |
| | 100% | 1000.0 | Total Gross Wt. | 1.000 |

This montmorillonite mineral fertilizer blend liquid for use in drip irrigation is prepared in a two-step process. The first step involves the preparation of a mineral "tea" or solution, which solution in a second step is mixed with other ingredients. In the first step, the milled montmorillonite mineral is mixed with the water and the citric acid, and then blended or mixed over an extended period of time sufficient for the citric acid to leach the montmorillonite into solution (leaving a residue composed mostly of silicates). The solution is filtered to remove the solid residue, and the filtered solution is then mixed with the *Aloe vera* and the potash.

By way of illustrative example, approximately one U.S. gallon of mineral fertilizer blend liquid for use in drip irrigation may be prepared by mixing 3.78 kilograms water, 0.60 kilograms milled montmorillonite, and 0.25 kilograms citric acid. The mineral is leached out and the silica residue removed. The resulting solution is then mixed with 0.30 kilograms *Aloe* liquid and 0.05 kilograms potash to yield a gallon of concentrated solution weighing approximately 4.98 kilograms. Prior to use, such a concentrate preferably is mixed with water in a ratio of between 1:95 and 1:105 to dilute for application via drip irrigation.

The foregoing fertilizer stimulates beneficial microorganisms and improves the structure of the soil. The growth of soil microbes, which play an important role in converting organic fertilizers into soluble nutrients that can be absorbed by plants, is promoted.

An alternative embodiment of the non-plugging fertilizer composition for use in drip irrigation systems includes both humate and montmorillonite mineral, leached using citric acid. "Humate" is a salt of humic acid, and is known for use as a beneficial ingredient for fertilizers. Humate is a mined mineral in the nature of an early stage in the development of coal from organic matter, and is rich in humic and fulvic acids, which are active components of soil humus (hence the name "humate"). Humate in a humic acid form remediates the soil and reduces the time required to decompose and provide nutrients to microorganisms in the soil. Humic acid is a combination of organic substances created as a result of the decomposition of plant and animal tissues that have been compressed over millions of years in the earth's soil. Humates occur in all soils, waters, and sediments that build up within the earth. In their most basic form, humates are a black, coal-like powder substance mined from the earth. Their size, molecular weight, elemental composition, structure, and the number and population of functional groups vary, depending on the origin and age of the material. Humate in all the compositions according to this disclosure is milled to pass a −200 (minus two hundred) mesh screen.

In the humate-montmorillonite formulation, the methods of converting dry minerals to a colloid and humate to humic acid can vary as long as the mineral profile and pH are correctly maintained in range. Both the mineral montmorillonite and the humate should be leached. A small quantity of citric acid is included. The leaching process can be done separately for the montmorillonite and the humate, and the leachate solutions then mixed together, or montmorillonite and humate can be leached together. Overall, the listing of ingredients for preparing a montmorillonite-humate fertilizer blend composition according to the present disclosure preferably comprises, by weight percent, between 14% and 18% humate, between 14% and 18% montmorillonite, between 0.5% and 1.5% *Aloe vera* liquid, between 0.1% and 0.3% potash, and employing between 0.1% and 0.3% citric acid, with a remainder between about 65.0% and 67.0% water. Table 5 below provides a formulation for a montmorillonite-humate fertilizer composition for use in drip irrigation systems.

TABLE 5

Mineral-Humate Fertilizer Blend Concentrate Liquid for Use in Drip Irrigation

| ITEM # | POTENCY PER UNIT | ADJ. GRAMS | INGREDIENT |
|---|---|---|---|
| 1 | 66.5% | 3785.00 | Water |
| 2 | 16.0% | 907.00 | Humate |
| 3 | 16.0% | 907.00 | Milled Montmorillonite |
| 4 | 0.2% | 9.00 | Pot Ash |
| 5 | 0.2% | 9.00 | Citric Acid |
| 6 | 1.1% | 60.00 | Aloe liquid |
| | 100.00% | 5677.00 | (Ingredients Gross Weight) |

As with the montmorillonite mineral fertilizer blend liquid for use in drip irrigation, the montmorillonite-humate fertilizer blend liquid for use in drip irrigation is prepared in a two-step process. The first step involves the preparation of a montmorillonite mineral-humate solution, which solution in a second step is mixed with other ingredients. In the first step, the montmorillonite and the humate are mixed with the water and the citric acid, and then blended or mixed over an extended period of time sufficient for the citric acid to leach the montmorillonite and humate into solution (leaving a mineral residue composed mostly of silicates). The solution is filtered to remove solid mineral residue (subtracting some weight to arrive at a net), and the filtered solution is then mixed with the *Aloe vera* and the potash.

By way of an illustrative example, approximately one U.S. gallon of montmorillonite-humate fertilizer blend liquid for use in drip irrigation may be prepared by mixing between about 3.690 kilograms and about 3.803 kilograms water, between about 0.794 kilograms and about 1.021 kilograms milled montmorillonite, between about 0.794 kilograms and about 1.021 kilograms milled humate, and between about 0.006 kilograms and about 0.017 kilograms citric acid. The mixing is continued for at least a minute. The minerals are leached out by the citric acid, after which silica residue is removed, for example by filtration to catch and collect larger particulates (e.g., greater than 0.0029 inches (74 micron) mean diameter). The resulting solution is then mixed with between about 0.028 kilograms and about 0.085 kilograms *Aloe* liquid. Potash is then added, with additional mixing, as needed to achieve a solution pH of between 6.8 and 7.0. For example, between about 0.006 kilograms and about 0.017 kilograms potash usually induces the desired pH range (depending upon the acidity of water used). The foregoing method produces about a gallon of concentrated solution suited for use. The ratios can be scaled up for producing larger batches as desired.

In one preferred embodiment, approximately one U.S. gallon of montmorillonite-humate fertilizer blend liquid for use in drip irrigation may be prepared by mixing 3.785 kilograms water, 0.907 kilograms milled montmorillonite, 0.907 kilograms milled humate, and 0.009 kilograms citric acid. The mixing is continued for at least a minute. The minerals are leached out by the citric acid, after which silica residue is removed, preferably by filtration. The resulting solution is then mixed with about 0.06 kilograms *Aloe* liquid. Potash is then added as needed to achieve a solution pH of between 6.8 and 7.0. For example, about 0.009 kilograms potash may induce the desired pH range, and yield one gallon of concentrated solution suited for use. Prior to use, such a concentrate preferably is mixed with water in a ratio of between 1:95 and 1:105 to dilute for application via drip irrigation.

Accordingly, a one-gallon batch of concentrated solution may be produced by mixing about a gallon of water with about two pounds of milled montmorillonite and about two pounds of humate, leaching the clay and humate with approximately 0.02 pounds citric acid, leaching and filtering the solids as described, and then mixing the resulting solution with approximately 0.02 pounds of potash and approximately 0.13 pounds of *Aloe*.

An alternative embodiment of the non-plugging fertilizer composition for use in drip irrigation systems includes humate, but without montmorillonite, but also leached using citric acid. A humate fertilizer blend composition according to this present disclosure preferably comprises, by weight percent, between 10% and 12% humate, between 5.5% and 6.5% *Aloe vera* liquid, between 0.5% and 1% potash, between 0.5% and 1% citric acid, and the remainder between 79.5% and 83.5% water. Table 6 below provides a most preferred formulation for a humate fertilizer composition for use in drip irrigation systems.

TABLE 6

| Humate Fertilizer Blend Concentrate Liquid for Use in Drip Irrigation | | | | |
|---|---|---|---|---|
| ITEM # | POTENCY PER UNIT | ADJ. GRAMS | INGREDIENT | Weight KG |
| 1 | 80.40% | 804.0 | Water | 0.804 |
| 2 | 11.76% | 117.6 | Humate | 0.118 |
| 3 | 0.92% | 9.2 | Pot Ash | 0.009 |
| 4 | 0.92% | 9.2 | Citric Acid | 0.009 |
| 5 | 6.00% | 60.0 | Aloe liquid | 0.060 |
| | 100.00% | 1000.00 | Total Gross Wt. | 1.000 |

Again, the humate-only fertilizer blend liquid for use in drip irrigation is prepared in the two-step process. The first step involves the preparation of the humate solution, which solution in a second step is mixed with the other ingredients. In the first step, the milled humate is mixed with the water and the citric acid, and then further blended or mixed over an extended period of time sufficient for the citric acid to leach the humate into solution. The solution is filtered if necessary to remove any large solids, then mixed with the *Aloe vera* and the potash.

By way of illustrative example, approximately one U.S. gallon of mineral fertilizer blend liquid for use in drip irrigation may be prepared by mixing 3.78 kilograms water, 0.56 kilograms milled humate, and 0.04 kilograms citric acid. The humate is leached into solution. The resulting solution is then mixed with 0.28 kilograms *Aloe* liquid and 0.04 kilograms potash to yield a gallon of concentrated solution weighing approximately 4.70 kilograms. Prior to use, such a concentrate preferably is mixed with water in a ratio of between 1:95 and 1:105 to dilute for application via drip irrigation.

In the foregoing tables, ingredients are listed by weight percent for a 1.0 kg exemplar sample. In all the forgoing tabulations, the percentages provided are optimums ascertained as a result of experimental research and/or calculation. A person of ordinary skill in the art will appreciate that modest deviations from the optimum, for any listed ingredient, are possible without significantly affecting the utility of the invention. Thus, a range of percentages is available for each individual component in each formulated embodiment. Suitable ranges are: For each ingredient listed as a double-digit weight percentage (i.e., 10% to 99%) a range may be ±5%; for each ingredient listed as a single-digit weight percentage (i.e., 1% to 9%) a range may be ±0.5%; For each ingredient listed as less than one weight percent (i.e., <1.0%) a range may be ±0.05%. It is to be understood that when ingredients are listed hereinabove in amounts and/or ratios, the composition may be consisting solely of the disclosed amounts or ratios.

The use and application of the fertilizer compositions described herein have been shown to increase plant growth and vitality. For example, in the cases of the "Mineral Fertilizer Blend Dry," "Mineral Fertilizer Blend Liquid," and "Mineral Fertilizer Blend Concentrate Liquid Root Dip" embodiments, time to harvest may be three weeks earlier than when conventional fertilizer is used. In experimental applications on *Cannabis sativa* plants, the plant THC and CBD concentrations were increased of 3% to 7%.

Although the invention has been described in detail with particular reference to these preferred embodiments, other embodiments can achieve the same results. In the previous description, specific details are set forth, such as specific materials, structures, chemicals, processes, etc., in order to provide a thorough understanding of the present invention. However, as one having ordinary skill in the art would recognize, the present invention can be practiced without resorting to the details specifically set forth. In other instances, well known principles of mathematics and physics have not been described in detail, in order not to unnecessarily obscure the present invention.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art and it is intended to cover in the appended claims all such modifications and equivalents.

What is claimed is:

1. A method for producing a montmorillonite-humate fertilizer blend liquid comprising:

mixing a solution of water, milled montmorillonite, milled humate, and citric acid;

leaching, with the citric acid, minerals from the solution;

filtering the solution to remove solid mineral residues; and mixing the filtered solution with aloe vera and potash.

2. The method according to claim 1 wherein mixing a solution of water, milled montmorillonite, milled humate, and citric acid comprises mixing between about 3.690 kilograms and about 3.803 kilograms water, between about 0.794 kilograms and about 1.021 kilograms milled montmorillonite, between about 0.794 kilograms and about 1.021 kilograms milled humate, and between about 0.006 kilograms and about 0.017 kilograms citric acid.

3. The method according to claim 2 wherein mixing a solution of water, milled montmorillonite, milled humate, and citric acid comprises mixing about 3.785 kilograms water, about 0.907 kilograms milled montmorillonite, about 0.907 kilograms milled humate, and about 0.009 kilograms citric acid.

4. The method according to claim 3 wherein mixing the filtered solution with the aloe vera and potash comprises:

mixing the filtered solution with about 0.06 kilograms aloe liquid; and adding to the solution potash as needed to achieve a solution pH of between 6.8 and 7.0.

5. The method according to claim 4 wherein adding potash comprises mixing into the solution about 0.009 kilograms potash.

6. The method according to claim 5 comprising scaling ingredients ratios to produce a large batch.

7. The method according to claim 2 wherein mixing the filtered solution with the aloe vera and potash comprises:

mixing the filtered solution with between about 0.028 kilograms and about 0.085 kilograms aloe liquid; and adding to the solution potash as needed to achieve a solution pH of between 6.8 and 7.0.

8. The method according to claim 7 wherein adding potash comprises mixing into the solution between about 0.006 kilograms and about 0.017 kilograms potash.

9. The method according to claim 8 comprising scaling ingredients ratios to produce a batch.

10. The method according to claim 1 wherein mixing a solution of water, milled montmorillonite, milled humate, and citric acid comprises mixing, by weight, between 14% and 18% humate, between 14% and 18% montmorillonite, and between 0.1% and 0.3% citric acid, with between about 65.0% and 67.0% water.

11. The method according to claim 10 wherein mixing the filtered solution with aloe vera and potash comprises mixing, by weight, between 0.5% and 1.5% aloe vera liquid, and between 0.1% and 0.3% potash.

12. The method according to claim 1 further comprising the step of acquiring montmorillonite from World Mine 73 in Mineral County, Nevada, USA.

13. A montmorillonite-humate fertilizer blend liquid prepared by the method of claim 4.

14. A montmorillonite-humate fertilizer blend liquid prepared by the method of claim 8.

* * * * *